(12) United States Patent
Kim et al.

(10) Patent No.: US 7,617,065 B2
(45) Date of Patent: Nov. 10, 2009

(54) METHODOLOGY FOR ESTIMATING STATISTICAL DISTRIBUTION CHARACTERISTICS OF PHYSICAL PARAMETERS OF SEMICONDUCTOR DEVICE

(75) Inventors: Dae-Wook Kim, Seoul (KR); Sang-Hoon Lee, Anyang-si (KR); Ji-Seong Doh, Hwaseong-si (KR); Moon-Hyun Yoo, Suwon-si (KR); Jong-Bae Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 301 days.

(21) Appl. No.: 11/698,690

(22) Filed: Jan. 26, 2007

(65) Prior Publication Data

US 2007/0192077 A1    Aug. 16, 2007

(30) Foreign Application Priority Data

Feb. 10, 2006    (KR) .................. 10-2006-0013189

(51) Int. Cl.
G06F 17/00    (2006.01)
(52) U.S. Cl. .................................................. 702/117
(58) Field of Classification Search ................ 702/117, 702/179, 181; 703/4, 14–16
See application file for complete search history.

(56) References Cited

U.S. PATENT DOCUMENTS

| | | | |
|---|---|---|---|
| 5,845,105 A | | 12/1998 | Kunikiyo et al. |
| 5,886,906 A * | 3/1999 | Tatsumi et al. ................. 703/14 |
| 6,618,837 B1 * | 9/2003 | Zhang et al. ..................... 716/4 |
| 6,795,800 B1 * | 9/2004 | Lee ................................. 703/2 |
| 7,155,359 B1 * | 12/2006 | Kim et al. ..................... 702/117 |
| 7,307,441 B2 * | 12/2007 | Sohn et al. ..................... 324/765 |
| 2006/0107244 A1* | 5/2006 | Yonezawa ....................... 716/4 |

FOREIGN PATENT DOCUMENTS

| | | |
|---|---|---|
| JP | 2001-352059 | 12/2001 |
| JP | 2002-110944 | 4/2002 |
| JP | 2002-141387 | 5/2002 |
| JP | 2005-340340 | 12/2005 |
| KR | 1996-0039105 | 11/1996 |
| KR | 10-2001-0038591 | 5/2001 |
| KR | 10-2005-0081264 | * 8/2005 |

* cited by examiner

*Primary Examiner*—Michael P. Nghiem
*Assistant Examiner*—Cindy H Khuu
(74) *Attorney, Agent, or Firm*—Mills & Onello LLP

(57) ABSTRACT

A method for estimating statistical distribution characteristics of physical parameters of a semiconductor device includes manufacturing a plurality of semiconductor device chips, each having a plurality of transistors, preparing electrical characteristic data by measuring electrical characteristics of the plurality of transistors included in the plurality of chips, extracting an inter-chip distribution characteristic and an intra-chip distribution characteristic of the electrical characteristics by analyzing the electrical characteristic data, generating random number data satisfying the extracted inter-chip and intra-chip distribution characteristics, and performing a simulation for extracting statistical distribution characteristic data of the physical parameters of the chips, based on the random number data.

20 Claims, 14 Drawing Sheets

ρ = −0.94

ρ =0.17

METHODOLOGY FOR ESTIMATING STATISTICAL DISTRIBUTION CHARACTERISTICS OF PHYSICAL PARAMETERS OF SEMICONDUCTOR DEVICE

CROSS-REFERENCE TO RELATED APPLICATIONS

This U.S. non-provisional patent application claims priority under 35 U.S.C. § 119 of Korean Patent Application No. 10-2006-0013189, filed on Feb. 10, 2006, the content of which is hereby incorporated by reference, in its entirety.

BACKGROUND OF THE INVENTION

Embodiments of the present invention disclosed herein relate to a methodology for estimating statistical distribution characteristics of parameters for product development.

The quality of a semiconductor-device-based product is generally dependent upon design rules and process conditions which are applied to the design and manufacture of the product. With the trend toward further integration of such devices, the design and manufacturing processes of industrial products become increasingly complicated. As a result, it is increasingly difficult to analyze the relationship of product quality relative to the design rules and the process conditions. Therefore, methods are required that can accurately and rapidly analyze correlations between the design rules or the process conditions and the product quality since enhanced accuracy and speed in analysis makes it possible to reduce the time-to-market of a new product.

Specifically, in manufacturing a high-technology semiconductor integrated circuit, the design and manufacturing procedures are quite complicated so that it is difficult to analyze the corresponding correlation. A manufacturer of a semiconductor integrated circuit fabricates the semiconductor integrated circuit based on a specification that defines requirements for electrical and structural characteristics. Early-on in the semiconductor industry, verification of a circuit design in accordance with a specification was performed by a human. However, as semiconductor circuits became more highly integrated, such verification was performed using a computer. Unfortunately, although computers having remarkably excellent computing power are employed for this task, the speed and accuracy of the circuit design verification is remarkably reduced as semiconductor circuit technology becomes more highly integrated.

In addition, as semiconductor devices become further reduced in size, a relative rate of a process variation occurring during the manufacturing process of the semiconductor device becomes increased. That is, a variation rate of process error of design features of the same size with respect to a reference size is further increased in a more highly integrated semiconductor integrated circuit. As a result, it is necessary to consider process variation in the design of the semiconductor integrated circuit. In particular, since the process variation has a great effect on the yield of the semiconductor device, it is increasingly important to estimate variation of the electrical characteristics of the product in accordance with process variation during the design stage.

Specifically, since the electrical characteristics of a semiconductor device are dependent on structural/physical parameters (hereinafter, referred to as independent parameters) such as channel length (L), device width (W), doping profile (Na or Nd), oxide thickness ($t_{ox}$), oxide permittivity ($\epsilon_{ox}$), channel length modulation constant ($\lambda$), or the like, it is necessary to estimate the statistical distribution of the independent parameters in order to enhance the yield of the semiconductor device. In a conventional method for estimating the statistical distribution of the independent parameters, referring to FIG. 1, a predetermined simulation (S2) is performed to estimate the product characteristic (S3). For simulation, design data, i.e., the independent parameters, are used as input data, wherein it is assumed that the design data have a predetermined distribution characteristic, e.g., a normal distribution characteristic. However, due to complications, such as the process variation or the like, it may not be proper to assume that the input data has the normal distribution characteristic. Since an improper input data incurs an inadequate estimation for product characteristic, it is insufficient that the design data to be used as the input data is assumed to have the normal distribution characteristic. Therefore, it should be necessary to estimate it properly.

Nevertheless, estimation of the statistical distribution of the independent parameters is generally not straightforward. For instance, although it is possible to derive an equation expressing the correlation between the independent parameters and the electrical characteristics dependent thereupon through physical theory, this approach is successful only in a very limited case. That is, in general, the equation may be a multivariable function, and further, variables of the equation are dependent upon process conditions, which are continuously updated for improving the yield of the product. Therefore, in practice, it is quite difficult to derive the equation through a theoretical approach. As a result, it is also difficult to obtain an adequate estimation of statistical distribution of the independent parameters using the conventional method.

In addition, though the statistical distributions of the independent parameters may be obtained from an actual measurement for the independent parameters in principle, it is impossible to measure them, in practice, because the time for measurement is too great. In order to overcome such a technical difficulty, another conventional method of estimating the statistical distribution by modeling one of the independent parameters can be employed. However, this conventional method is still limited in that it cannot extract information about other, non-selected, independent parameters. In particular, since these modeling methods are based on a modeling fitting which requires a long procedure for calculation, they cannot provide a physical meaning for the correlation between the independent parameters and the electrical characteristics dependent thereupon. In addition, a large amount of time is required for such a calculation.

SUMMARY OF THE INVENTION

Embodiments of the present invention provide a method for accurately and rapidly analyzing a correlation between independent parameters determining characteristics of products, and dependent parameters.

Embodiments of the present invention also provide a method for estimating statistical distribution characteristics capable of understanding a physical relation between the independent parameters and dependent parameters, for improving product quality and reducing development period.

In one aspect, methods of estimating statistical distribution characteristics of physical parameters of a semiconductor device using data obtained through an analysis of correlation between actually measured electrical characteristic data are provided. The methods include: manufacturing a plurality of semiconductor device chips, each having a plurality of transistors; preparing electrical characteristic data by measuring electrical characteristics of the plurality of transistors included in the plurality of chips; extracting an inter-chip distribution characteristic and an intra-chip distribution characteristic of the electrical characteristics by analyzing the electrical characteristic data; generating random number data satisfying the extracted inter-chip and intra-chip distribution characteristics; and performing a simulation for extracting statistical distribution characteristic data of the physical parameters of the chips, based on the random number data.

In some embodiments, measuring of the electrical characteristics comprises measuring a characteristic selected from the group consisting of: a drain-source current, a threshold voltage, and an off-current of the transistor.

In some embodiments, the extracting of the inter-chip and intra-chip distribution characteristics includes: extracting statistical characteristics of the respective electrical characteristics; and determining a correlation coefficient between the electrical characteristics using the statistical characteristics. Herein, the extracting of the statistical characteristics of the respective characteristics includes calculating means and standard deviations of the respective electrical characteristics.

In other embodiments, the correlation coefficient is obtained by substituting measured values, means and standard deviations of the respective electrical characteristics into an equation:

$$\rho_{xy} = \frac{\text{cov}(X, Y)}{\sigma_X \sigma_Y} = \frac{E[(X - \mu_X)(Y - \mu_Y)]}{\sigma_X \sigma_Y}$$

where the X and Y denote respective measured values of selected different electrical characteristics, $\sigma_X$ and $\sigma_Y$ denote respective standard deviations of selected different electrical characteristics, $\mu_X$ and $\mu_Y$ denote respective means of selected different electrical characteristics, and cov and E denote a covariance and an expectation value, respectively.

In other embodiments, the extracting of the intra-chip distribution includes: partitioning the chip into a plurality of sub-regions; selecting a predetermined transistor disposed in the predetermined sub-region as a reference transistor; calculating a distance between the reference transistor and a selected transistor; extracting statistical characteristics of the respective electrical characteristics according to the distance between the reference transistor and the selected transistor; and determining a correlation coefficient between the electrical characteristics according to the distance between the reference transistor and the selected transistor, using the distance-dependent statistical characteristics of the electrical characteristics.

In still other embodiments, the distance-dependent correlation coefficient between the electrical characteristics is selected as the correlation coefficient of the inter-chip distribution characteristic when the selected transistor and the reference transistor are included in the same sub-region and wherein the distance-dependent correlation coefficient between the electrical characteristics is calculated according to the distance between the reference transistor and the selected transistor when the selected transistor and the reference transistor are not included in the same sub-region.

In even other embodiments, the extracting of the intra-chip distribution characteristic includes: preparing a correlation matrix in which the distance-dependent correlation coefficient between the electrical characteristics is expressed on the basis of the distance between the selected transistor and the reference transistor and a correlation between different electrical characteristics; and obtaining a relation equation for the electrical characteristics of the transistors by analyzing the correlation matrix using a multivariate statistical analysis technique. Herein, the analyzing of the correlation matrix using a multivariate statistical analysis technique can be performed using a principal component analysis (PCA) technique.

In yet other embodiments, the methods further include performing the simulation based on the statistical distribution characteristic data of the physical parameters of the chips, to estimate characteristics of chips to be subsequently manufactured.

BRIEF DESCRIPTION OF THE FIGURES

The accompanying figures are included to provide a further understanding of the embodiments of the present invention, and are incorporated in and constitute a part of this specification. The drawings illustrate exemplary embodiments of the present invention and, together with the description, serve to explain principles of the present invention. In the figures.

DETAILED DESCRIPTION OF EMBODIMENTS OF THE INVENTION

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete.

Exemplary embodiments of the present invention will now be described in conjunction with the accompanying drawings.

Figure 1:
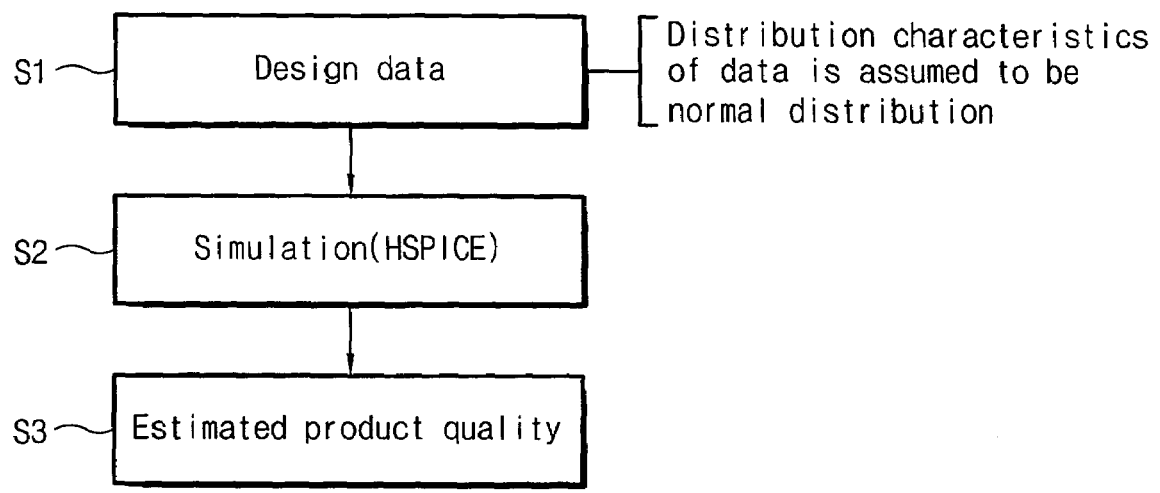
FIG. 1 is a flowchart illustrating a conventional method for estimating characteristics of a product.
Figure 2:
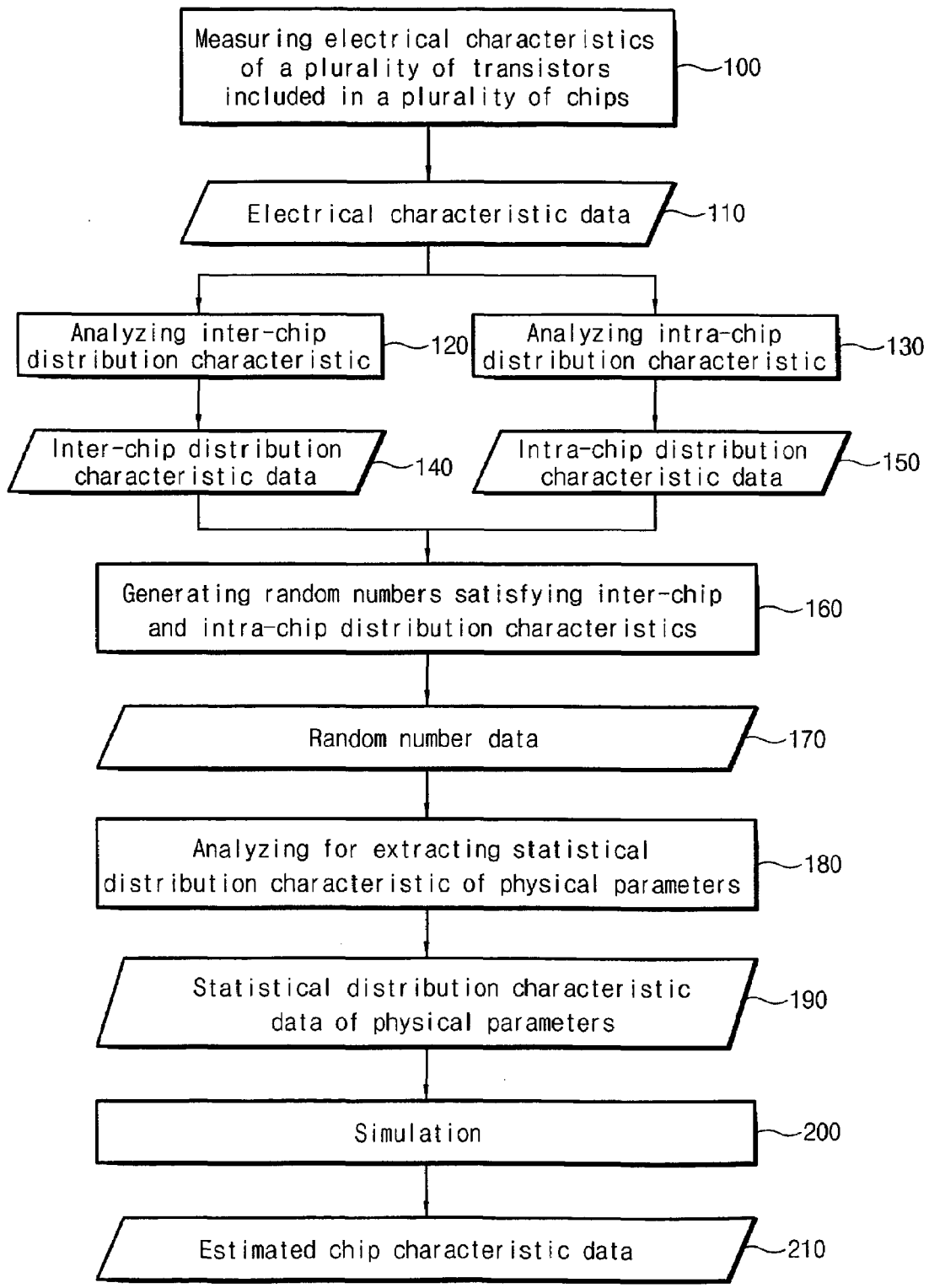
FIG. 2 is a flowchart illustrating a method for estimating statistical distribution characteristics of physical parameters of a semiconductor device in accordance with embodiments of the present invention.

FIG. 2 is a flowchart illustrating a method for estimating statistical distribution characteristics of physical parameters of a semiconductor device in accordance with embodiments of the present invention.

Referring to FIG. 2, a plurality of chips having a plurality of transistors are manufactured. The chips may be formed on a single wafer, or on multiple, different, wafers. Subsequently, the electrical characteristics of the transistors included in the chips are measured (100), and thereafter, electrical characteristic data 110 are prepared. According to embodiments of the present invention, the electrical characteristic data 110 are used for analyzing the variation of manufacturing process of the chips and a correlation between the electrical characteristics of the transistors.

Figure 3A:
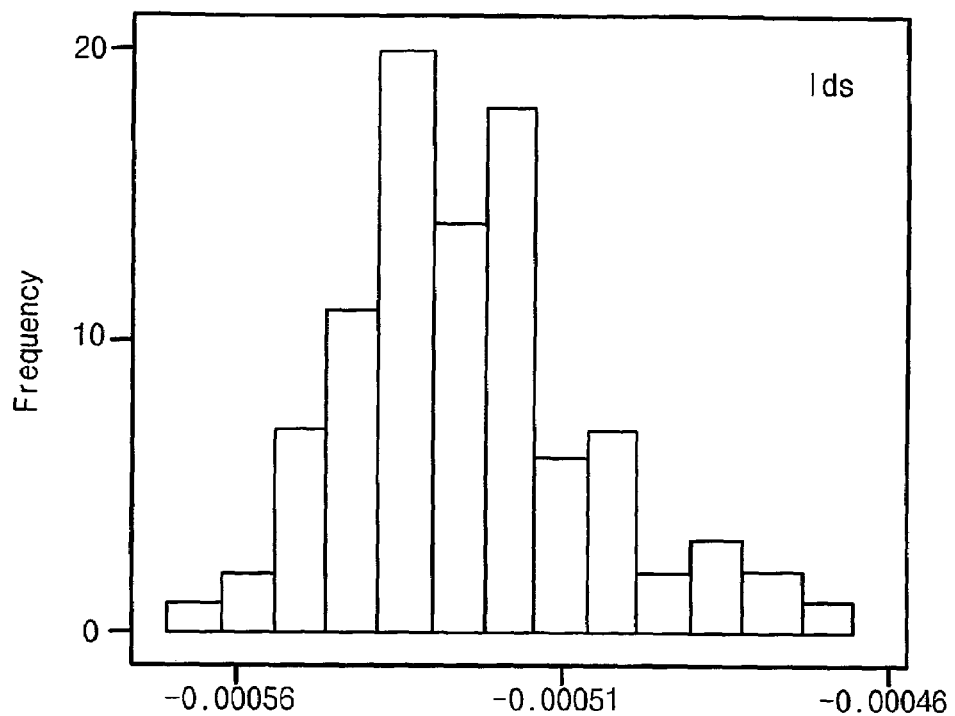
FIGS. 3A, 3B and 3C are graphs illustrating distribution characteristics of drain-source current ($I_{ds}$), threshold voltage ($V_{th}$) and off-current ($I_{off}$) of transistors, respectively.
Figure 3B:
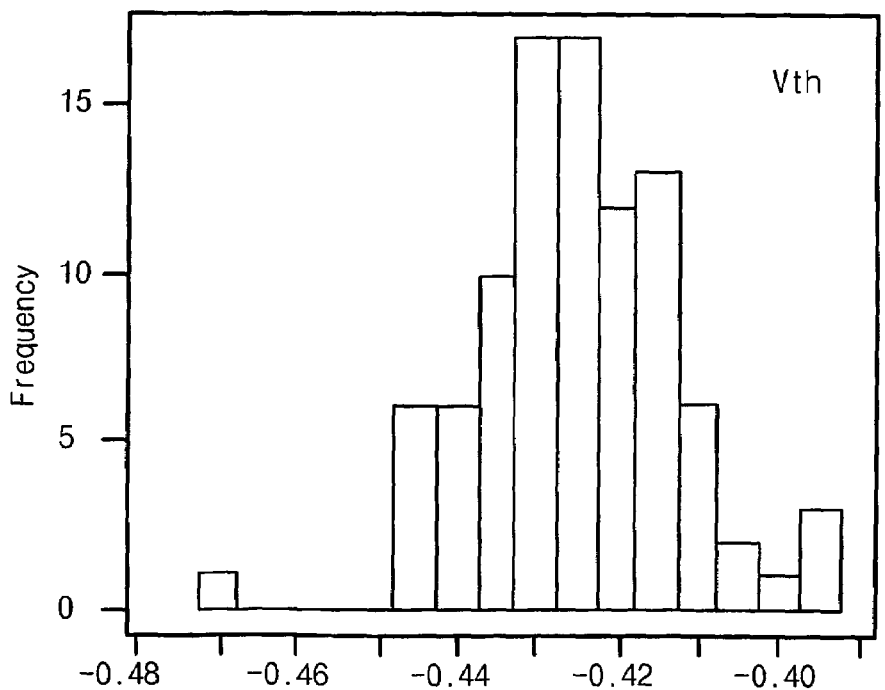
Figure 3C:
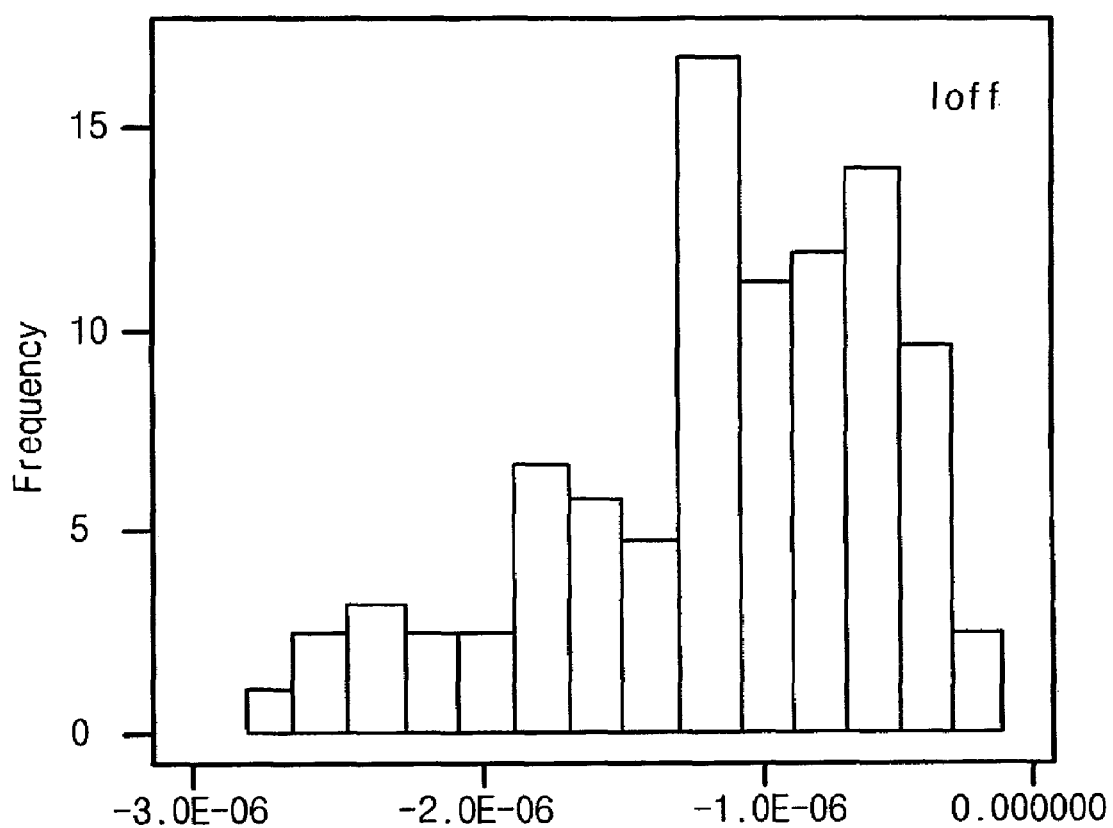

In accordance with an embodiment of the present invention, the electrical characteristics can include, for example, a drain-source current ($I_{ds}$), a threshold voltage ($V_{th}$), an off-current ($I_{off}$), and the like. FIGS. 3A, 3B and 3C are graphs illustrating distribution characteristics of drain-source current ($I_{ds}$), threshold voltage ($V_{th}$) and off-current ($I_{off}$) of transistors, respectively. However, the electrical characteristics are not limited to these exemplified parameters, and thus, other electrical characteristics of transistors such as a breakdown voltage of a gate insulating layer, a breakdown voltage of source/drain junction region, a punchthrough voltage, or the like, may be selected as the electrical characteristics for which electrical characteristic data are prepared for analysis.

Through statistical analysis based on the electrical characteristic data 110, there are extracted an inter-chip distribution characteristic data 140 and an intra-chip distribution characteristic data 150. Herein, the inter-chip distribution characteristic data 140 contain statistical distribution characteristic data of electrical characteristics of transistors included in different chips, whereas the intra-chip distribution characteristic data 150 contain statistical distribution characteristic data of electrical characteristics of transistors included in the same chip according to positions thereof. According to the present invention, these inter-chip and intra-chip distribution characteristic data 140 and 150 contain data for the correlation between the electrical characteristics. In addition, the inter-chip and intra-chip distribution characteristic data 140 and 150 may be obtained through an inter-chip distribution characteristic analysis 120 and an intra-chip distribution characteristic analysis 130, respectively, which will be more fully illustrated herein with reference to FIGS. 4 and 7.

Thereafter, a plurality of random numbers are generated 160 such that they satisfy the inter-chip and intra-chip distribution characteristic data 140 and 150. A set of the generated random numbers constitutes random number data 170 used in an analysis for extracting the statistical characteristic data of physical parameters. That is, through the analysis 180 based on the random number data 170, there are extracted statistical characteristic data 190 of physical parameters (hereinafter, referred to as physical characteristic data 190) caused by variations in the manufacturing process of the chip. Herein, the analysis 180 for extracting the physical characteristic data 190 can comprise, for example, a simulation using the random number data.

The physical characteristic data 190 contain expected statistical data for physical/structural characteristics of the transistor such as a channel length, a thickness of a gate insulating layer, a channel concentration, or the like. For example, in the case of mass production of the chips, the physical characteristic data 190 may contain the statistical data, i.e., mean, standard deviation, variance, etc, which will be expected with regard to the variation of the channel length. However, the physical characteristic data 190 are not limited to the exemplified ones, and thus it may include other physical/structural characteristics of the transistor such as impurity concentrations of gate electrode/source/drain, a channel width, depths of source/drain, a doping profile of the channel, and the like.

Following this, a simulation 200 on the basis of the physical characteristic data 190 is performed so as to extract statistical distribution characteristic data of the chip quality 210, which is to be expected during mass production of the chips. The chip quality can contain, for example, operational characteristics of the chip such as access time and delay time, as well as DC properties and AC properties. The simulation for estimating the chip quality on the basis of these physical characteristic data 190 can be performed using a simulation tool such as a well-known SPICE or the like. However, according to embodiments of the present invention, since the physical characteristic data 190 are obtained from measured data of electrical characteristics of the manufactured chips, the distribution characteristic is different from that provided in the conventional approach in that it is not assumed to be a normal distribution, but rather, it is actually measured. In addition, according to embodiments of the present invention, the physical characteristic data 190 has a more increased conformity with reality than that of the conventional approach, because they are obtained on the basis of information with regard to the correlation between the measured electrical characteristic data 110.

Figure 4:
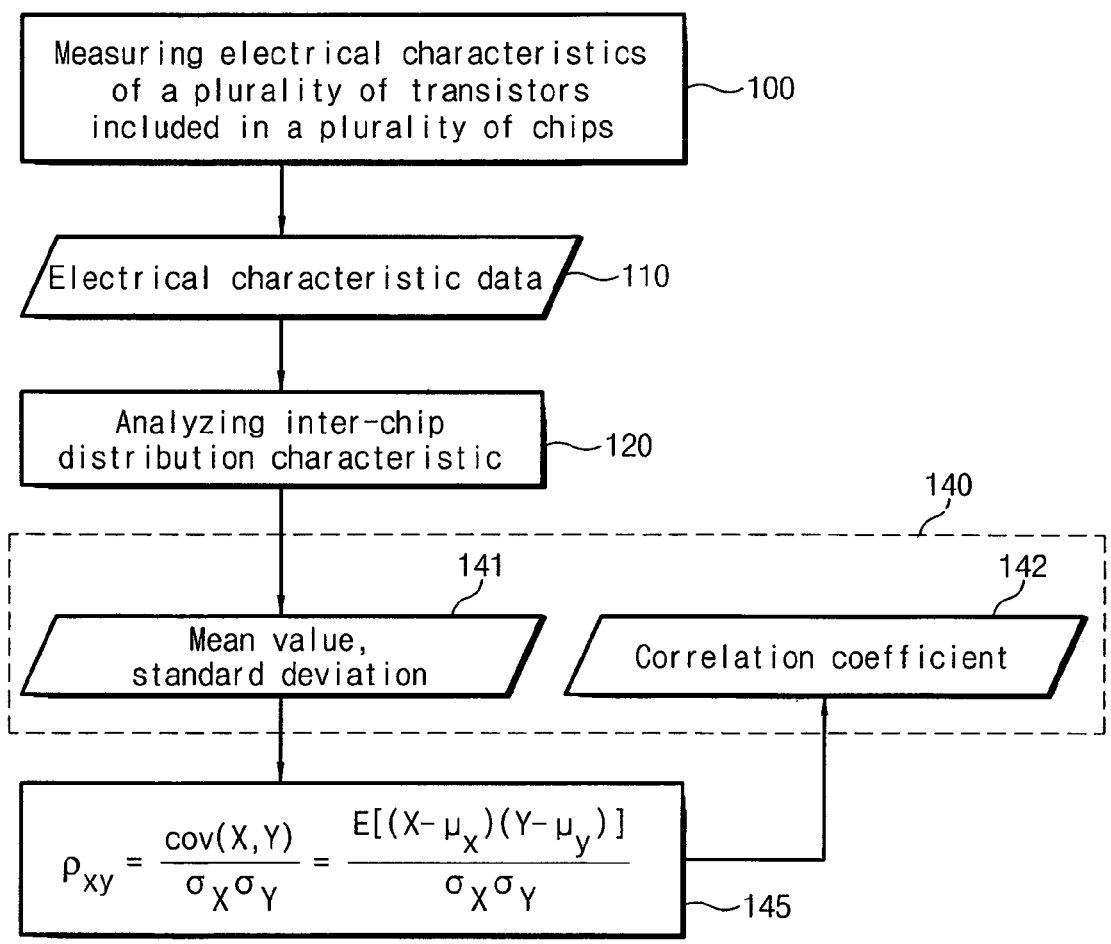
FIG. 4 is a flowchart illustrating a method for estimating an inter-chip distribution characteristic in accordance with embodiments of the present invention.

FIG. 4 is a flowchart illustrating a method for estimating an inter-chip distribution characteristic in accordance with embodiments of the present invention.

Referring to FIG. 4, as described above, the electrical characteristic data 110 contain a plurality of data for the electrical characteristics measured from the transistors included in the manufactured chips. The estimation of the inter-chip distribution characteristic according to the present invention, includes: analyzing the electrical characteristic data 120; obtaining respective means and standard deviations for the electrical characteristics such as drain-source current ($I_{ds}$), threshold voltage ($V_{th}$) and off-current ($I_{off}$) 141; and obtaining the correlation coefficient 142 between the respective electrical characteristics using a following equation 145.

$$\rho_{xy} = \frac{\text{cov}(X, Y)}{\sigma_X \sigma_Y} = \frac{E[(X - \mu_X)(Y - \mu_Y)]}{\sigma_X \sigma_Y} \quad \text{[Eq. 1]}$$

where X and Y denote respective measured values of selected different electrical characteristics, $\sigma_X$ and $\sigma_Y$ denote respective standard deviations of the selected different electrical characteristics, $\mu_X$ and $\mu_Y$ denote respective means of the selected different electrical characteristics, and cov and E denote a covariance and an expectation value, respectively.

Figure 5A:
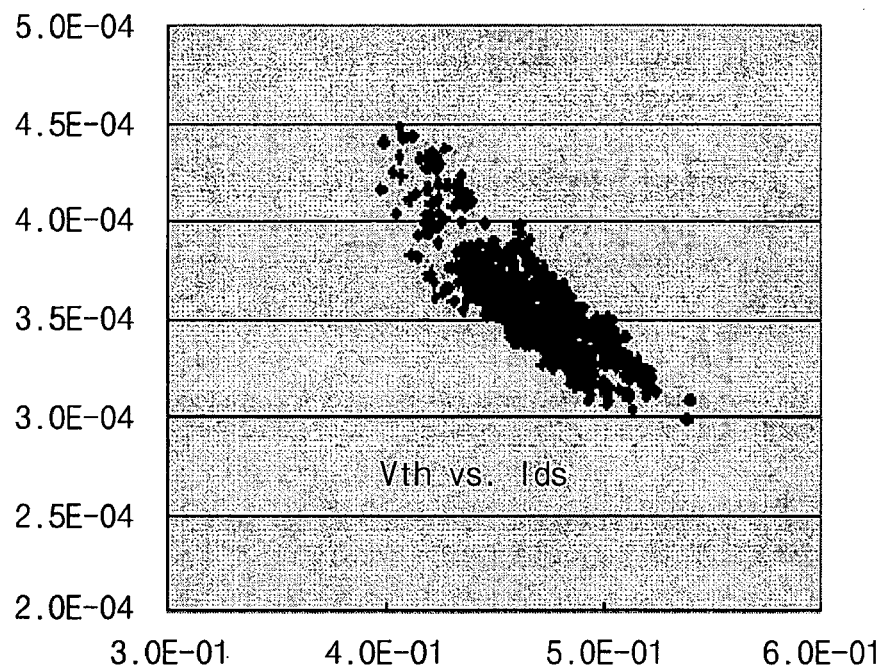
FIGS. 5A, 5B and 5C are graphs illustrating correlations among threshold voltage ($V_{th}$), drain-source current ($I_{ds}$), and off-current ($I_{off}$) of transistors, respectively.
Figure 5B:
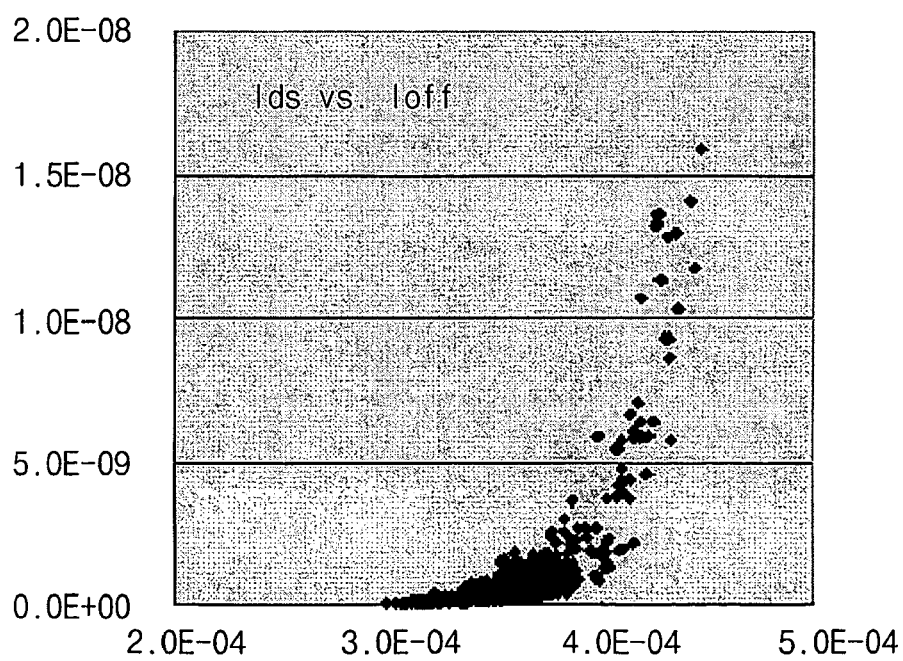
Figure 5C:
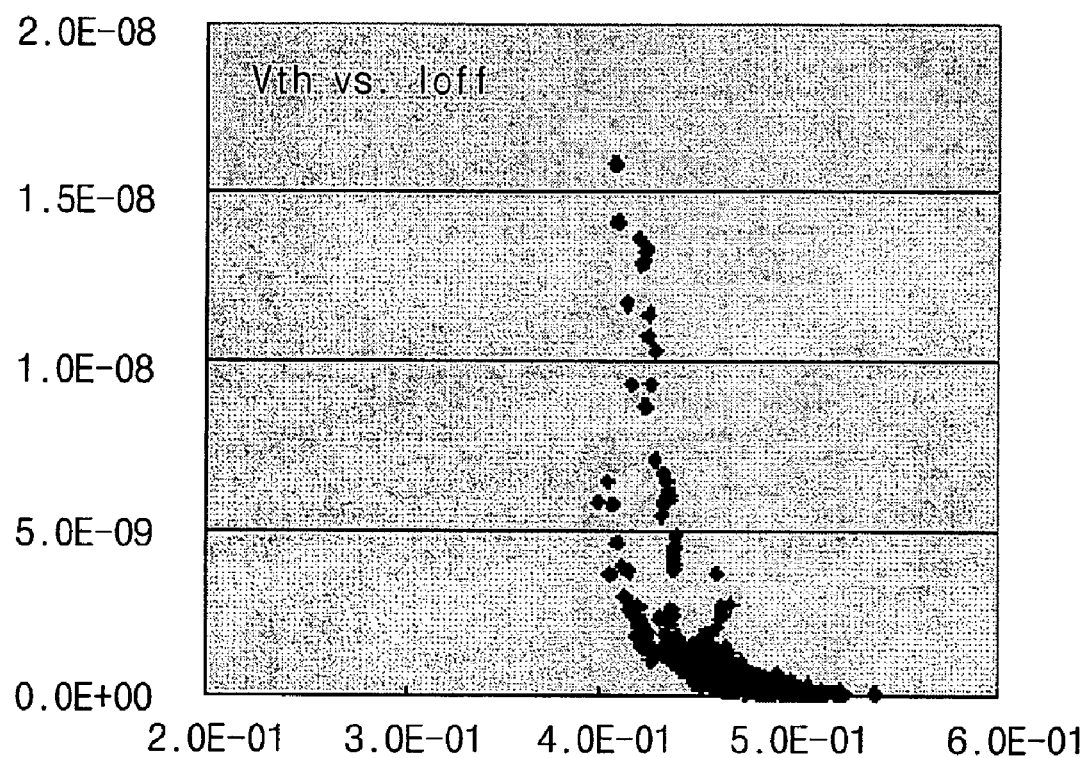

FIGS. 5A, 5B and 5C are graphs illustrating correlations among threshold voltage ($V_{th}$), drain-source current ($I_{ds}$), and off-current ($I_{off}$) of transistors, respectively. Specifically, axes of abscissa and ordinate of FIG. 5A represent the threshold voltages ($V_{th}$) and the drain-source currents ($I_{ds}$), respectively, and axes of abscissa and ordinate of FIG. 5B represent the drain-source currents ($I_{ds}$), and the off-currents ($I_{off}$), respectively. In addition, axes of abscissa and ordinate of FIG. 5C represent the threshold voltages ($V_{th}$) and the off-currents ($I_{off}$), respectively.

Referring to FIGS. 5A, 5B and 5C, it is understood that the threshold voltage ($V_{th}$), drain-source current ($I_{ds}$) and off-current ($I_{off}$) of the transistors are not independent from one another but rather, they have predetermined correlations. If there is no correlation among them, points marked in the graphs would not demonstrate anisotropy. However, as illustrated in FIGS. 5A through 5C, it is construed that the electrical characteristics have considerable correlations because the points marked in the graphs are distributes along specific identifiable profiles.

Figure 6A:
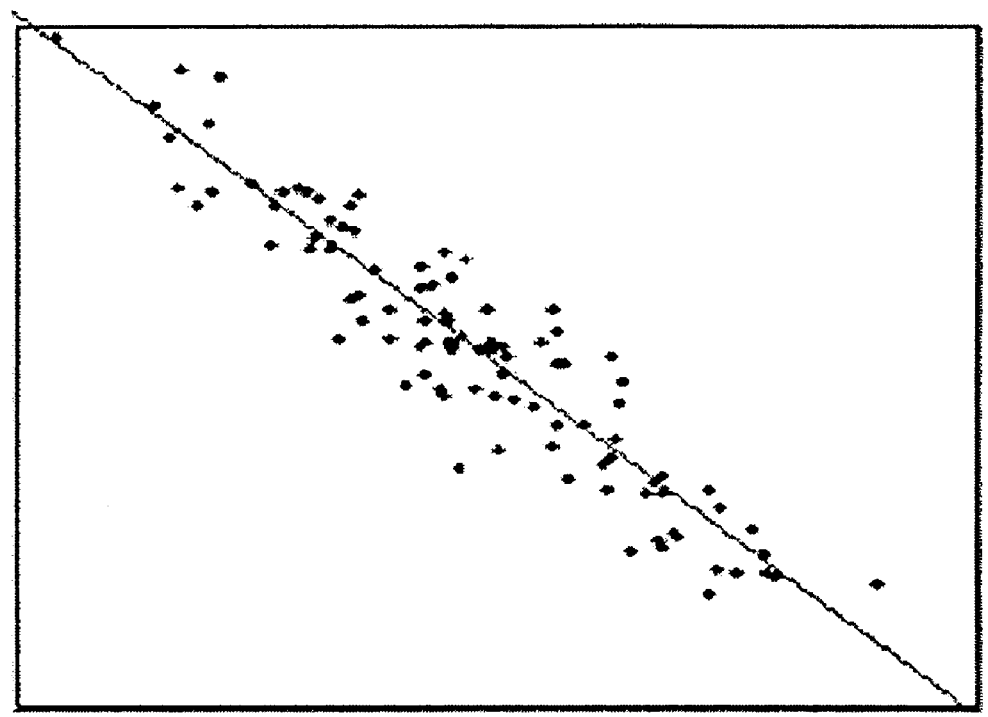
FIGS. 6A and 6B are graphs illustrating data distributions corresponding to predetermined correlation coefficients, respectively.
Figure 6B:
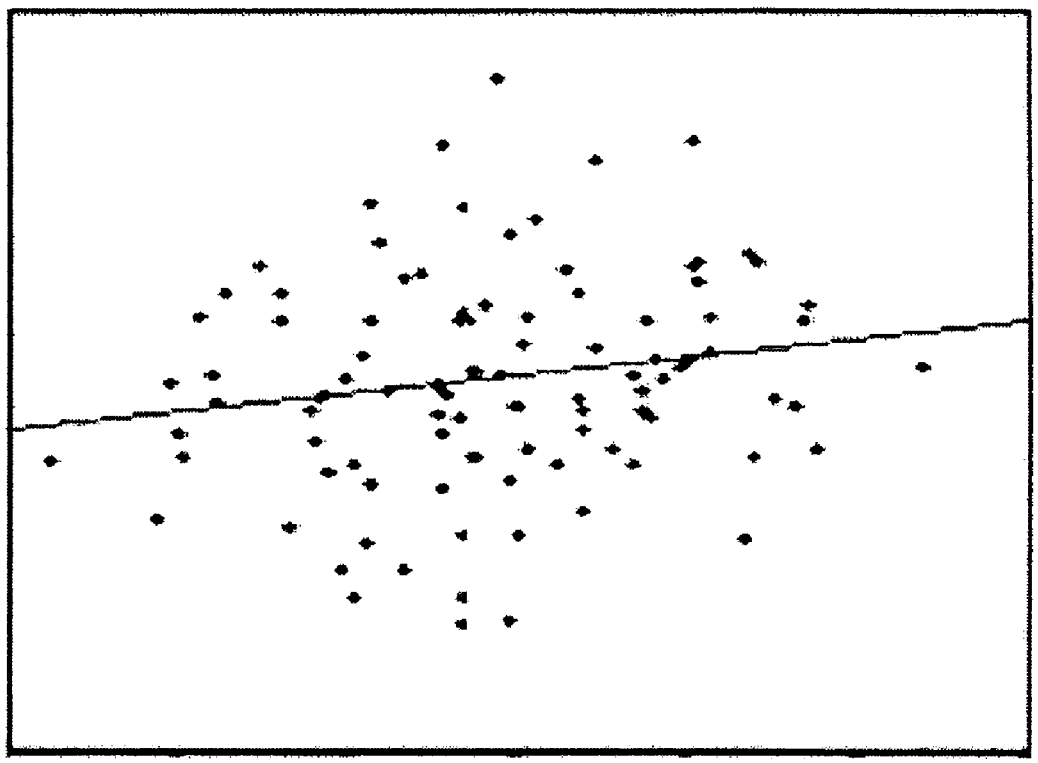

This correlation may be quantatively expressed as a correlation coefficient, which may be obtained through Eq. 1. For example, in the graph of FIG. 5A illustrating the correlation between the threshold voltages ($V_{th}$) and the drain-source currents ($I_{ds}$), the correlation coefficient $\rho_{xy}$ is about −0.7 supposing that the variables X and Y of Eq. 1 are the drain-source currents ($I_{ds}$) and the threshold voltages ($V_{th}$), respectively. The obtained correlation coefficients can be used in modeling the relation between the electrical characteristics. FIGS. 6A and 6B are graphs illustrating data distributions when respective correlation coefficients are −0.94 and 0.17, respectively.

Figure 7:
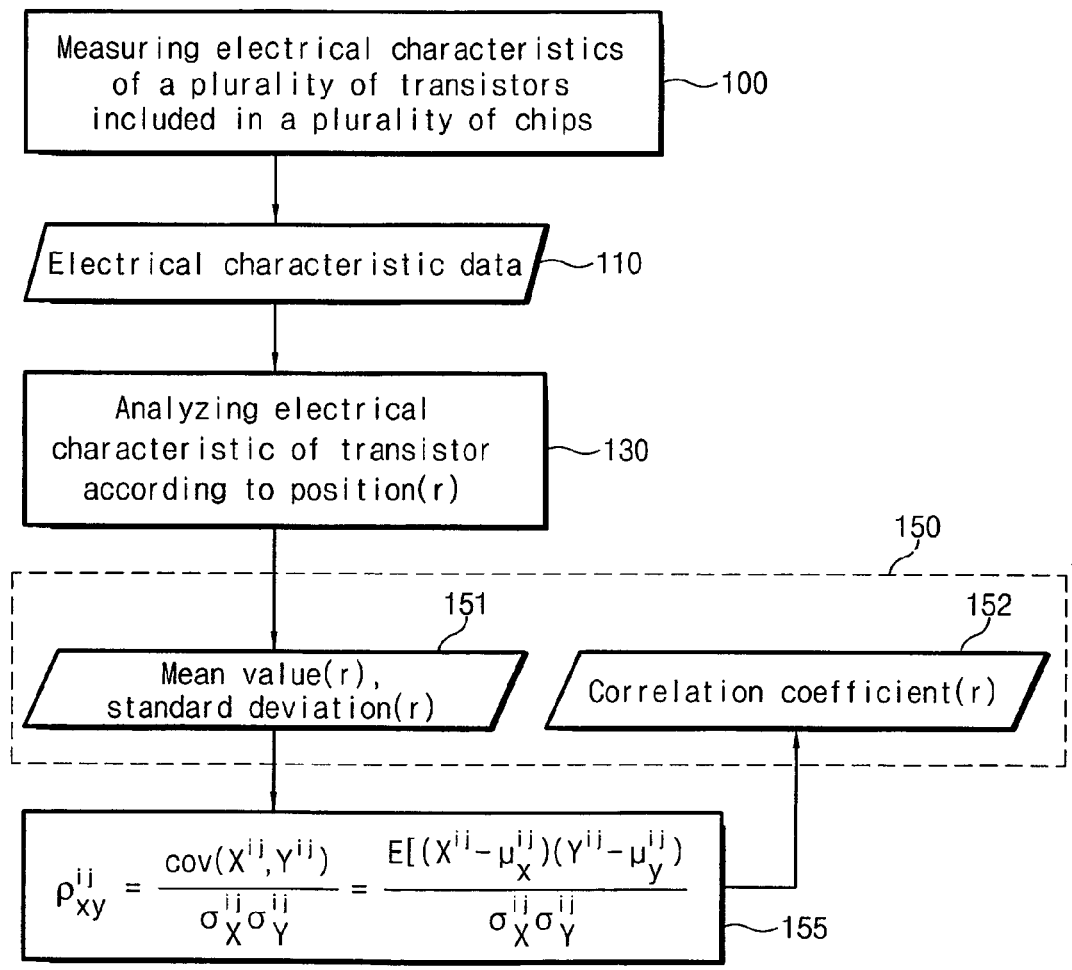
FIG. 7 is a flowchart illustrating a method for estimating an intra-chip distribution characteristics in accordance with embodiments of the present invention.

FIG. 7 is a flowchart illustrating a method for estimating intra-chip distribution characteristics in accordance with embodiments of the present invention.

Referring to FIG. 7, in accordance with the estimation of the intra-chip distribution characteristic in accordance with embodiments of the present invention, electrical data 110 according to positions of selected transistors are analyzed 130. Subsequently, there are obtained means and standard deviations for respective electrical characteristics, e.g., the threshold voltage ($V_{th}$), drain-source current ($I_{ds}$) and off-current ($I_{off}$) 151. Thereafter, the obtained means and standard deviations are substituted into Eq. 2 below, and the correlation coefficient 152 between the electrical characteristics according to the position of the selected transistor is then obtained 155.

$$\rho_{xy}^{ij} = \frac{\text{cov}(X^{ij}, Y^{ij})}{\sigma_X^{ij} \sigma_Y^{ij}} = \frac{E[(X^{ij} - \mu_x^{ij})(Y^{ij} - \mu_y^{ij})]}{\sigma_X^{ij} \sigma_Y^{ij}} \quad \text{[Eq. 2]}$$

where the superscripts i and j are indexes for distinguishing respective selected transistors, $X^{ij}$ and $Y^{ij}$ denote respective measured values of selected different electrical characteristics of the selected transistors, $\sigma_X^{ij}$ and $\sigma_Y^{ij}$ denote respective standard deviations of selected different electrical characteristics of the selected transistor, and $\mu_x^{ij}$ and $\mu_y^{ij}$ denote respective means of selected different electrical characteristics of the selected transistor.

Figure 8A:
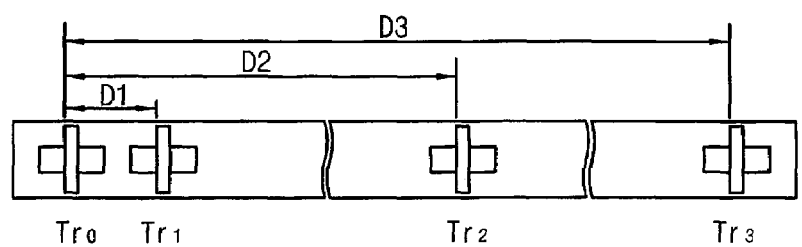
FIGS. 8A, 8B and 8C are schematic views illustrating a method for analyzing a position dependency of electrical characteristics in accordance with an embodiment of the present invention.
Figure 8B:
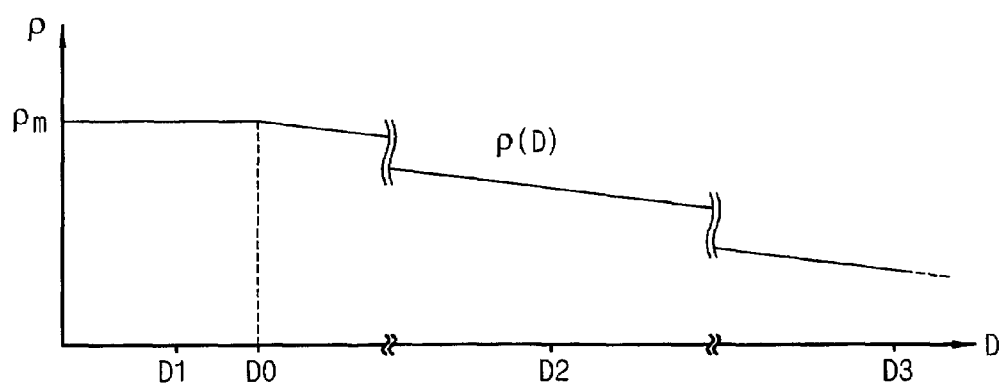
Figure 8C:
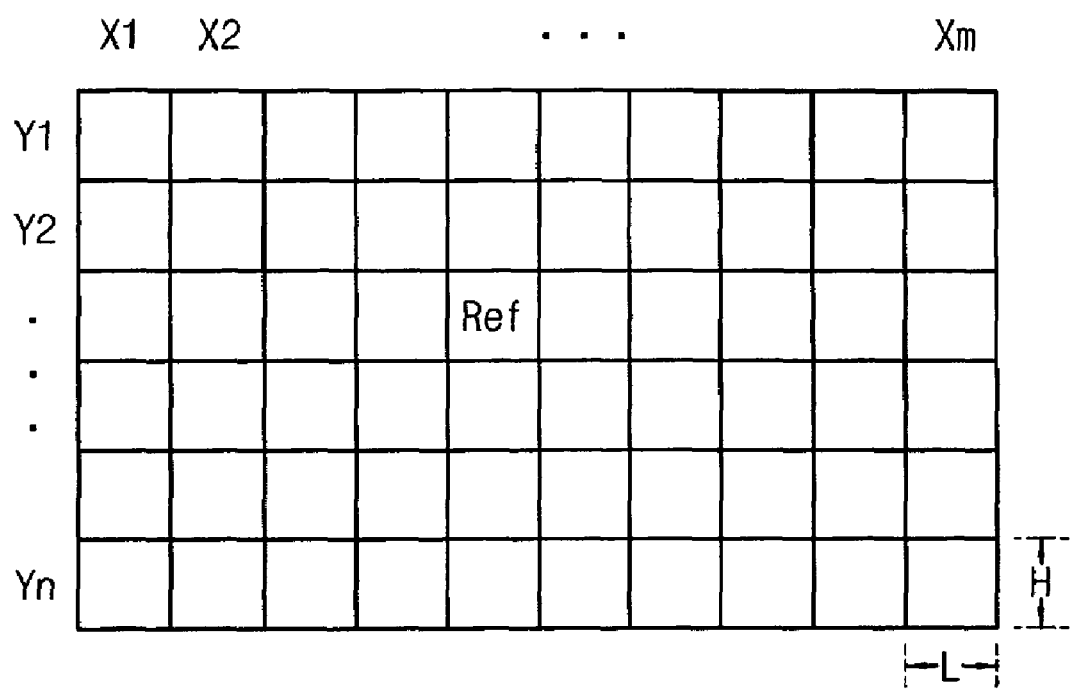

FIGS. 8A, 8B and 8C are schematic views illustrating a method for analyzing a position dependency of electrical characteristics in accordance with one embodiment of the present invention.

Referring to FIGS. 8A, 8B and 8C, in order to increase the efficiency of analysis, the intra-chip distribution characteristic may be analyzed for two cases of which one case is that a transistor $Tr_1$ is spaced apart from a predetermined reference transistor $Tr_0$ by a separation distance which is smaller than a predetermined reference length D0, and another case is that transistors $TR_2$ and $TR_3$ are spaced apart from the predetermined reference transistor $Tr_0$ by separation distances which are greater than the predetermined reference length D0.

In detail, when the space D1 between the reference transistor and a comparison transistor is less than several, to several tens, of micrometers, it is construed that these two transistors are manufactured under nearly the same conditions. Therefore, the difference between the electrical characteristics of the transistors can be estimated to be random in this case. In other words, the distance dependency of the electrical characteristic of the transistor may be negligible in this case. Herein, the reference distance D0 may be set to a predetermined distance within which the distance dependency can be neglected, and it may decrease/increase in consideration of the efficiency of analysis. In this case, i.e., D1<D0, the statistical distribution characteristic may be analyzed based on the method for estimating the inter-chip distribution characteristic, i.e., Eq. 1, as illustrated above with reference to FIG. 4.

However, when the distance between the reference transistor and the comparison transistor is greater than the reference distance, the difference between the electrical characteristics of the transistors is dependent upon the distance therebetween. Specifically, supposing that the distances between each of second and third comparison transistors $Tr_2$ and $TR_3$ and the reference transistor $Tr_0$ are D2 and D3, respectively, and an inequality condition is D3>D2>D0, the difference of the electrical characteristic between the second comparison transistor $Tr_2$ and the reference transistor $Tr_0$ may be greater than the difference of the electrical characteristic between the first comparison transistor $Tr_1$ and the reference transistor $Tr_0$. Likewise, the difference of the electrical characteristic between the third comparison transistor $Tr_3$ and the reference transistor $Tr_0$ may be greater than the difference of the electrical characteristic between the second comparison transistor $Tr_2$ and the reference transistor $Tr_0$. That is, as the distance between the comparison transistor and the reference transistor increases, the correlation of the electrical characteristic between the reference transistor $Tr_0$ and the comparison transistor is reduced.

The correlation having the distance dependency may be quantatively expressed as the correlation coefficient which can be obtained from Eq. 2. FIG. 8B is a graph illustratively showing the distance dependency of the correlation coefficient. The obtaining of the correlation having the distance dependency includes steps of preparing the electrical characteristic data 110 such that they contain data for positions of measured transistors, and subsequently, obtaining the distance between the measured transistor and the reference transistor using the position data. Subsequently, after analyzing the electrical characteristic data 110 and obtaining the mean and the standard deviation according to the position or distance of the measured transistor, these are substituted into Eq. 2 to thereby obtain a correlation coefficient. Referring to FIG. 8B, as described above, the correlation coefficient is a constant, i.e., $\rho_m$, if D<D0, whereas the correlation coefficient, i.e., $\rho(D)$, decreases as the distance D between the measured transistor and the reference transistor increases, if D>D0.

Meanwhile, in consideration of the efficiency of analysis, a single semiconductor chip can be partitioned into a plurality of sub-regions as illustrated in FIG. 8C. Each of the sub-regions may take the form of a rectangle of which lengths of transverse and longitudinal sides are L and H, respectively. Herein, the lengths of transverse and longitudinal sides are determined on the basis of the aforementioned reference length. According to one embodiment of the present invention, the lengths of transverse and longitudinal sides of the sub-region may be set to be equal to the reference length D0, i.e., L=D0 and H=D0. In this case, when the comparison transistor and the reference transistor are included in the same sub-region, the correlation coefficient therebetween is determined as the correlation coefficient of the inter-chip distribution characteristic, i.e., the constant correlation coefficient $\rho_m$. On the contrary, when the comparison transistor and the reference transistor are included in the different sub-regions, the correlation coefficient therebetween is determined using the correlation coefficient function having the distance dependency as illustrated in FIG. 8B, after obtaining the distance between centers of the respective sub-regions.

The obtained correlation coefficients may constitute a correlation matrix for the electrical characteristics of all the transistors included in the semiconductor chip. The correlation matrix is prepared such that it represents the correlation coefficient between the electrical characteristics according to the distance, based on the distance between the selected transistor and the reference transistor and the correlation between different electrical characteristics. Subsequently, the correlation matrix is analyzed using multivariate statistical analysis technique so as to obtain the relation between the electrical characteristics of the transistors. At this time, it is preferable to make use of a principal component analysis (PCA) as the multivariate statistical analysis technique. After generating random numbers satisfying the inter-chip and intra-chip distribution characteristic data 140 and 150 using the relation, they are substituted into equations 3, 4 and 5 below, thereby obtaining distribution values of the respective electrical characteristics. Herein, the distribution values of the electrical characteristics are used as input data during an analysis procedure 180 for extracting statistical characteristic data 190 of the physical parameters.

$$I_{ds} = \mu(I_{ds}) + \sigma(I_{ds}) \cdot R_1 \quad \text{[Eq. 3]}$$

$$V_{th} = \mu(V_{th}) + \sigma(V_{th}) \cdot R_2 \quad \text{[Eq. 4]}$$

$$I_{off} = \mu(I_{off}) + \sigma(I_{off}) \cdot R_3 \quad \text{[Eq. 5]}$$

Figure 9A:
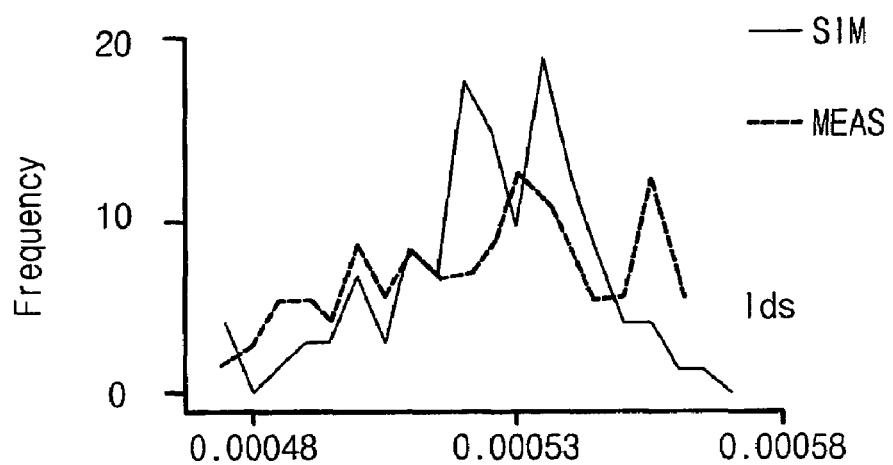
FIGS. 9A, 9B and 9C are graphs illustrating results of a method for estimating statistical distribution characteristics in accordance with an embodiment of the present invention.
Figure 9B:
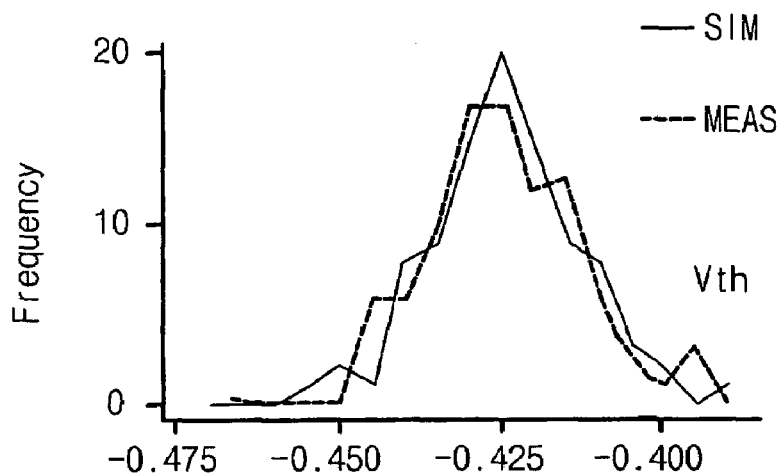
Figure 9C:
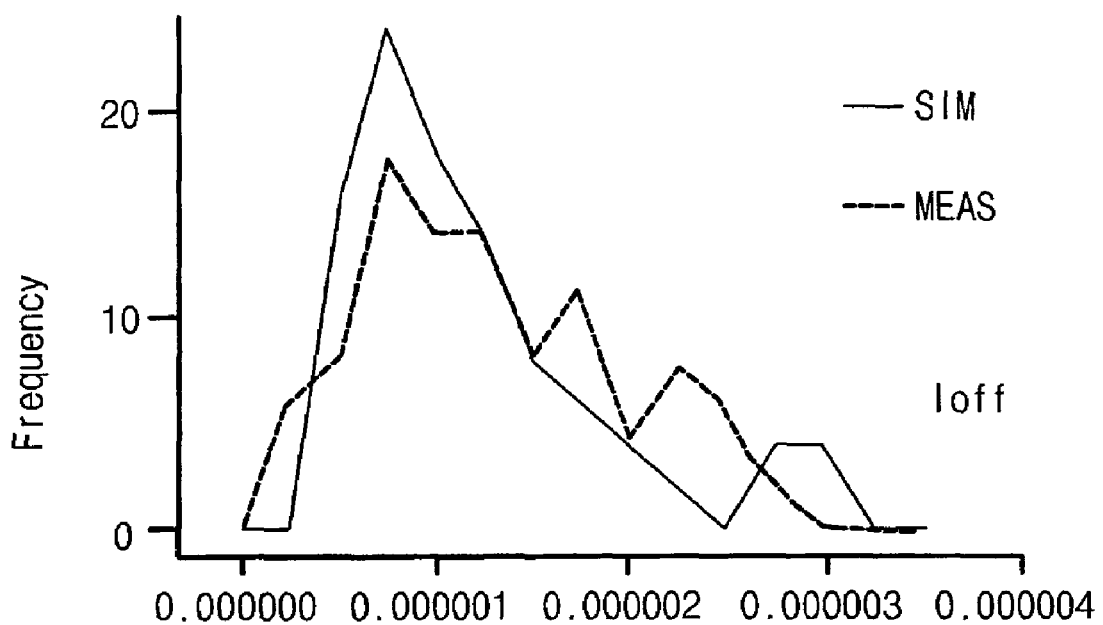

FIGS. 9A, 9B and 9C are graphs illustrating results of a method for estimating statistical distribution characteristics in accordance with an embodiment of the present invention. In detail, FIGS. 9A, 9B and 9C are graphs that compare the statistical distribution characteristic data 210 of the chip quality estimated through the disclosed embodiments of the present invention using actually measured electrical characteristic data of the semiconductor chips. In addition, FIGS. 9A, 9B and 9C illustrate results of drain-source current ($I_{ds}$), threshold voltage ($V_{th}$) and off-current ($I_{off}$) for respective transistors. Referring to FIGS. 9A, 9B and 9C, it may be understood that the statistical distribution characteristic data 210 of the chip quality estimated through the results of the disclosed embodiments correlate considerably with the actually measured electrical characteristic data of the semiconductor chips.

The estimation for the characteristics of chip quality according to the embodiments of the present invention is obtained through correlation analysis of electrical characteristic data having position data as well as actual measured data. Specifically, the input data for a simulation of estimating the characteristics of the chip quality are prepared on the basis of the actually-measured electrical characteristic data and the random number data satisfying the correlation therebetween. Accordingly, the input data of the simulation has more increased conformity with reality in comparison with that of the conventional techniques, and as a result, a more accurate estimation of the characteristic of chip quality can be achieved.

In addition, since the actually-measured electrical characteristics can be electrically measured with ease, the time for measurement and analysis is reduced. Such increased accuracy for estimation and reduction of time for measurement/analysis renders rapid product development period and reduced time-to-market more likely.

While embodiments of the invention have been particularly shown and described above, it will be understood by those skilled in the art that various changes in form and detail may be made herein without departing from the spirit and scope of the invention as defined by the appended claims.

What is claimed is:

1. A method for estimating statistical distribution characteristics of physical parameters of a semiconductor device, the method comprising:
   manufacturing a plurality of semiconductor device chips, each including a plurality of transistors;
   measuring electrical characteristics of the plurality of transistors included in the plurality of actually manufactured chips so as to prepare actually measured electrical characteristic data;
   analyzing the actually measured electrical characteristic data so as to extract an inter-chip distribution characteristic and an intra-chip distribution characteristic of the electrical characteristics;
   generating random number data satisfying the extracted inter-chip and intra-chip distribution characteristics; and
   performing a simulation based on the random number data to extract statistical distribution characteristic data of the physical parameters of the chips.

2. The method of claim 1, wherein the measuring of the electrical characteristics comprises measuring a characteristic selected from the group consisting of: a drain-source current, a threshold voltage, and an off-current of the transistor.

3. The method of claim 1, wherein the extracting of the inter-chip and intra-chip distribution characteristics comprises:
   extracting statistical characteristics of the respective electrical characteristics; and
   determining a correlation coefficient between the electrical characteristics using the statistical characteristics.

4. The method of claim 3, wherein the extracting of the statistical characteristics of the respective characteristics comprises obtaining means and standard deviations of the respective electrical characteristics.

5. The method of claim 4, wherein the correlation coefficient is obtained by substituting measured values, means and standard deviations of the respective electrical characteristics into an equation:

$$\rho_{xy} = \frac{\text{cov}(X, Y)}{\sigma_X \sigma_Y} = \frac{E[(X - \mu_X)(Y - \mu_Y)]}{\sigma_X \sigma_Y}$$

where the X and Y denote respective measured values of selected different electrical characteristics, $\sigma_X$ and $\sigma_Y$ denote respective standard deviations of selected different electrical characteristics, $\mu_X$ and $\mu_Y$ denote respective means of selected different electrical characteristics, and cov and E denote a covariance and an expectation value, respectively.

6. The method of claim 3, wherein the extracting of the intra-chip distribution characteristic comprises:
   partitioning the chip into a plurality of sub-regions;
   selecting a predetermined transistor disposed in the predetermined sub-region as a reference transistor;
   obtaining a distance between the reference transistor and a selected transistor;
   extracting statistical characteristics of the respective electrical characteristics according to the distance between the reference transistor and the selected transistor; and
   determining a distance-dependent correlation coefficient between the electrical characteristics using the distance-dependent statistical characteristics of the electrical characteristics.

7. The method of claim 6, wherein the distance-dependent correlation coefficient between the electrical characteristics is selected as the correlation coefficient of the inter-chip distribution characteristic when the selected transistor and the reference transistor are included in the same sub-region, and wherein the distance-dependent correlation coefficient between the electrical characteristics is obtained according to the distance between the reference transistor and the selected transistor when the selected transistor and the reference transistor are not included in the same sub-region.

8. The method of claim 7, wherein the extracting of the intra-chip distribution characteristic comprises:

preparing a correlation matrix in which the distance-dependent correlation coefficient between the electrical characteristics is expressed on the basis of the distance between the selected transistor and the reference transistor and a correlation between different electrical characteristics; and obtaining a relation equation for the electrical characteristics of the transistors by analyzing the correlation matrix using a multivariate statistical analysis technique.

9. The method of claim 8, wherein the analyzing of the correlation matrix using a multivariate statistical analysis technique is performed using a PCA (principal component analysis) technique.

10. The method of claim 1, further comprising: performing the simulation based on the statistical distribution characteristic data of the physical parameters of the chips to estimate characteristics of chips, to be subsequently manufactured.

11. A method for estimating statistical distribution characteristics of physical parameters of a semiconductor device, the method comprising:

manufacturing a plurality of semiconductor device chips, each including a plurality of transistors;

measuring electrical characteristics of the plurality of transistors included in the plurality of chips so as to prepare electrical characteristic data;

analyzing the electrical characteristic data so as to extract an inter-chip distribution characteristic and an intra-chip distribution characteristic of the electrical characteristics;

generating random number data satisfying the extracted inter-chip and intra-chip distribution characteristics; and performing a simulation based on the random number data to extract statistical distribution characteristic data of the physical parameters of the chips, wherein the extracting of the inter-chip and intra-chip distribution characteristics comprises:

extracting statistical characteristics of the respective electrical characteristics; and determining a correlation coefficient between the electrical characteristics using the statistical characteristics, wherein the extracting of the statistical characteristics of the respective characteristics comprises obtaining means and standard deviations of the respective electrical characteristics, and wherein the correlation coefficient is obtained by substituting measured values, means and standard deviations of the respective electrical characteristics into an equation:

$$\rho_{xy} = \frac{\text{cov}(X, Y)}{\sigma_X \sigma_Y} = \frac{E[(X - \mu_X)(Y - \mu_Y)]}{\sigma_X \sigma_Y}$$

where the X and Y denote respective measured values of selected different electrical characteristics, $\sigma_X$ and $\sigma_Y$ denote respective standard deviations of selected different electrical characteristics, $\mu_X$ and $\mu_Y$ denote respective means of selected different electrical characteristics, and cov and E denote a covariance and an expectation value, respectively.

12. The method of claim 11, wherein the measuring of the electrical characteristics comprises measuring a characteristic selected from the group consisting of: a drain-source current, a threshold voltage, and an off-current of the transistor.

13. The method of claim 11, wherein the extracting of the intra-chip distribution characteristic comprises:

partitioning the chip into a plurality of sub-regions;

selecting a predetermined transistor disposed in the predetermined sub-region as a reference transistor;

obtaining a distance between the reference transistor and a selected transistor;

extracting statistical characteristics of the respective electrical characteristics according to the distance between the reference transistor and the selected transistor; and determining a distance-dependent correlation coefficient between the electrical characteristics using the distance-dependent statistical characteristics of the electrical characteristics.

14. The method of claim 13, wherein the distance-dependent correlation coefficient between the electrical characteristics is selected as the correlation coefficient of the inter-chip distribution characteristic when the selected transistor and the reference transistor are included in the same sub-region, and wherein the distance-dependent correlation coefficient between the electrical characteristics is obtained according to the distance between the reference transistor and the selected transistor when the selected transistor and the reference transistor are not included in the same sub-region.

15. The method of claim 14, wherein the extracting of the intra-chip distribution characteristic comprises:

preparing a correlation matrix in which the distance-dependent correlation coefficient between the electrical characteristics is expressed on the basis of the distance between the selected transistor and the reference transistor and a correlation between different electrical characteristics; and obtaining a relation equation for the electrical characteristics of the transistors by analyzing the correlation matrix using a multivariate statistical analysis technique.

16. The method of claim 15, wherein the analyzing of the correlation matrix using a multivariate statistical analysis technique is performed using a PCA (principal component analysis) technique.

17. The method of claim 11, further comprising: performing the simulation based on the statistical distribution characteristic data of the physical parameters of the chips to estimate characteristics of chips, to be subsequently manufactured.

18. A method for estimating statistical distribution characteristics of physical parameters of a semiconductor device, the method comprising:

manufacturing a plurality of semiconductor device chips, each including a plurality of transistors;

measuring electrical characteristics of the plurality of transistors included in the plurality of chips so as to prepare electrical characteristic data;

analyzing the electrical characteristic data so as to extract an inter-chip distribution characteristic and an intra-chip distribution characteristic of the electrical characteristics;

generating random number data satisfying the extracted inter-chip and intra-chip distribution characteristics; and performing a simulation based on the random number data to extract statistical distribution characteristic data of the physical parameters of the chips, wherein the extracting of the inter-chip and intra-chip distribution characteristics comprises:

extracting statistical characteristics of the respective electrical characteristics; and determining a correlation coefficient between the electrical characteristics using the statistical characteristics, wherein the extracting of the intra-chip distribution characteristic comprises:

partitioning the chip into a plurality of sub-regions;

selecting a predetermined transistor disposed in the predetermined sub-region as a reference transistor;

obtaining a distance between the reference transistor and a selected transistor;

extracting statistical characteristics of the respective electrical characteristics according to the distance between the reference transistor and the selected transistor; and determining a distance-dependent correlation coefficient between the electrical characteristics using the distance-dependent statistical characteristics of the electrical characteristics.

19. The method of claim 18, wherein the distance-dependent correlation coefficient between the electrical characteristics is selected as the correlation coefficient of the inter-chip distribution characteristic when the selected transistor and the reference transistor are included in the same sub-region, and wherein the distance-dependent correlation coefficient between the electrical characteristics is obtained according to the distance between the reference transistor and the selected transistor when the selected transistor and the reference transistor are not included in the same sub-region.

20. The method of claim 19, wherein the extracting of the intra-chip distribution characteristic comprises:

preparing a correlation matrix in which the distance-dependent correlation coefficient between the electrical characteristics is expressed on the basis of the distance between the selected transistor and the reference transistor and a correlation between different electrical characteristics; and obtaining a relation equation for the electrical characteristics of the transistors by analyzing the correlation matrix using a multivariate statistical analysis technique, wherein the analyzing of the correlation matrix using a multivariate statistical analysis technique is performed using a PCA (principal component analysis) technique.

* * * * *

UNITED STATES PATENT AND TRADEMARK OFFICE
CERTIFICATE OF CORRECTION

| | |
|---|---|
| PATENT NO. | : 7,617,065 B2 |
| APPLICATION NO. | : 11/698690 |
| DATED | : November 10, 2009 |
| INVENTOR(S) | : Dae-Wook Kim et al. |

Page 1 of 1

It is certified that error appears in the above-identified patent and that said Letters Patent is hereby corrected as shown below:

Column 12, line 3 delete "B" and insert --E--

Signed and Sealed this

Sixteenth Day of February, 2010

David J. Kappos
*Director of the United States Patent and Trademark Office*